United States Patent
Fu et al.

(10) Patent No.: US 8,518,605 B2
(45) Date of Patent: Aug. 27, 2013

(54) CERAMIC MATERIAL COMBINATION FOR AN ANODE OF A HIGH-TEMPERATURE FUEL CELL

(75) Inventors: Qingxi Fu, Karlsruhe (DE); Frank Tietz, Juelich (DE); Hans-Peter Buchkremer, Heinsberg (DE); Detlev Stoever, Nierderzier (DE)

(73) Assignee: Forschungszentrum Juelich GmbH, Juelich (DE)

( * ) Notice: Subject to any disclaimer, the term of this patent is extended or adjusted under 35 U.S.C. 154(b) by 627 days.

(21) Appl. No.: 12/309,375

(22) PCT Filed: Jun. 26, 2007

(86) PCT No.: PCT/DE2007/001132
§ 371 (c)(1),
(2), (4) Date: Mar. 4, 2009

(87) PCT Pub. No.: WO2008/003288
PCT Pub. Date: Jan. 10, 2008

(65) Prior Publication Data
US 2010/0028757 A1 Feb. 4, 2010

(30) Foreign Application Priority Data
Jul. 1, 2006 (DE) .......................... 10 2006 030 393

(51) Int. Cl.
*H01M 4/02* (2006.01)
(52) U.S. Cl.
USPC ........... 429/523; 429/484; 429/486; 429/488; 429/489
(58) Field of Classification Search
USPC ................ 429/484, 486, 488, 489, 523
See application file for complete search history.

(56) References Cited

U.S. PATENT DOCUMENTS

| 2002/0014417 A1 | 2/2002 | Kuehnle et al. |
| 2003/0124412 A1 | 7/2003 | Barnett et al. |

(Continued)

FOREIGN PATENT DOCUMENTS

| CN | 1739213 | 2/2006 |
| DE | 100 26 940 | 12/2001 |

(Continued)

OTHER PUBLICATIONS

Gadolinia-Doped Ceria and Yttria Stabilized Zirconia Interfaces: Regarding their Application for SOFC Technology A. Tsoga, A. Gupta, A. Naoumidis and P. Nikolopoulos Acta Mater. 48 (2000) p. 4709-4714.

(Continued)

*Primary Examiner* — Melvin C Mayes
*Assistant Examiner* — Melissa Stalder
(74) *Attorney, Agent, or Firm* — Jordan and Hamburg LLP (57) ABSTRACT

The invention relates to an anode for a high-temperature fuel cell having an anode substrate and/or a functional anode layer, comprising a porous ceramic structure having a first predominantly electron-conducting phase with the general empirical formula $Sr_{1-x}Ln_xTiO_3$ wherein Ln=Y, Gd to Lu and $0.03<x<0.2$, and having a second predominantly ion-conducting phase component comprising yttrium or scandium-stabilized zirconium dioxide (YSZ or ScSZ). In the anode substrate and/or the functional anode layer, the ratio by volume of the first phase to the second phase ranges from 80:20 to 50:50, and particularly from 70:30 to 60:40. The porosity of the entire anode ranges between 15 and 50% by volume. The anode additionally comprises a catalyst in the amount of no more than 15% of the total volume, which is disposed on the surface of the pores of the ceramic structure.

17 Claims, 6 Drawing Sheets

(56) References Cited

U.S. PATENT DOCUMENTS

| | | |
|---|---|---|
| 2003/0165726 A1 | 9/2003 | Robert et al. |
| 2004/0001994 A1* | 1/2004 | Marina et al. ............... 429/40 |
| 2004/0018409 A1 | 1/2004 | Hui et al. |
| 2004/0043272 A1 | 3/2004 | Gorte et al. |
| 2004/0081893 A1 | 4/2004 | Hansen et al. |
| 2004/0121222 A1 | 6/2004 | Sarkar et al. |
| 2004/0185327 A1 | 9/2004 | Gorte et al. |
| 2004/0265669 A1 | 12/2004 | Yoo et al. |
| 2005/0250000 A1 | 11/2005 | Marina et al. |
| 2006/0024547 A1* | 2/2006 | Waldbillig et al. ............ 429/33 |

FOREIGN PATENT DOCUMENTS

| | | |
|---|---|---|
| DE | 2002 13 789 | 3/2004 |
| WO | WO-00/64814 | 11/2000 |
| WO | WO-03/041196 | 5/2003 |
| WO | WO-03/075383 | 9/2003 |

OTHER PUBLICATIONS

S. Koutcheiko, Y. Yoo, A. Petric, I. Davison: "Effect of ceria on properties of yttrium-doped strontium titanate ceramics" Ceramics International, vol. 32, Mar. 5, 2005, pp. 67-72, XP002452688 on-line.

S. Hui, A. Petric: "Evaluation of yttrium-doped $SrTiO_3$ as an anode for solid oxide fuel cells" Journal of The European Ceranic Society, vol. 22, 2002, pp. 1673-1681, XP002452689.

* cited by examiner

CERAMIC MATERIAL COMBINATION FOR AN ANODE OF A HIGH-TEMPERATURE FUEL CELL

The invention relates to an anode material for use in electrochemical solid electrolyte cells, and particularly as an anode substrate in anode-supported high-temperature fuel cells.

BACKGROUND OF THE INVENTION

Anode materials are used in electrochemical cells, and particularly in solid electrolyte fuel cells and in electrolytic cells having working temperatures ranging between 500 and 950° C. The materials used in the composition of such cells must meet several requirements in order to be employed as anodes. They must exhibit excellent catalytic properties for the electrochemical conversion of the gases on the electrodes, and ensure the transport of the electric current and the ionic current, while they must also have sufficient stability over many temperature cycles and over long periods of time.

A variety of material compositions, technologies, and designs are known from the literature for composition of high-temperature fuel cells at laboratory and pilot production scales. In the electrochemical cells mentioned above, the anode plays the role of electrochemically converting the combustible gas (hydrogen, methane, or hydrocarbons having longer chains) into carbon dioxide, water, and electrons that are used as electric energy. To this end, the oxygen ions delivered by the electrolyte material are reacted with the combustible gas on a catalyst surface, the gaseous products being removed via the existing porosity of the material and the electrons being removed via an electrically conductive phase. In order to ensure sufficient electron, ion, and gas transport, structures having porosities between 20 and 50% and materials having high electrical and ionic conductivity are employed.

Most anodes employed today therefore consist of a nickel/ ion conductor composite, wherein typically zirconium oxide (YSZ or ScSZ), which is completely or partially stabilized with yttrium oxide or scandium oxide, or lanthanide-containing (for example, Y, Sm, Gd and the like) cerium oxides (abbreviated as CYO, CSO, or CGO) are used as the ion conductor.

As an anode, an Ni/YSZ composite typically having 40% by volume porosity, 24% by volume Ni, and 36% by volume YSZ has approximately the following properties:
  Electrical conductivity (at 800° C.): 100-400 S/cm
  (pure nickel: 23,000 S/cm)
  Ionic conductivity (at 800° C.): approx. 0.001-0.006 S/cm
  (pure YSZ with 8 mole % $Y_2O_3$: 0.056 S/cm)
  Thermal coefficient of expansion: $12\text{-}13 \times 10^{-6}$ $K^{-1}$
In these "cermets", the nickel assumes both the function of the electrical conductor and that of the catalyst.

The configuration of the fuel cell can differ in that, either an anode is simply applied to a thick electrolyte substrate, or the anode itself is used as the substrate. Typically, an additional anode layer, also referred to as the functional anode layer, which has an optimized microstructure (see FIG. 1), is then used to improve the electrochemical activity. The electrolyte then has a thickness of only 5-50 µm, and as a result of the reduced thickness, the ohmic resistance of the fuel cell is also decreased, thereby allowing for advantageous use of such anode-supported fuel cells at lower temperatures of 600-800° C.

A significant disadvantage of anode-supported fuel cells, however, is the mechanical instability of the anode substrate if it is once again exposed to an oxidizing atmosphere during or after operation. The reoxidation of the metallic nickel into nickel oxide is associated with a significant increase in volume, resulting in cracks in the anode substrate as well as the thin electrolyte layer. Thus, ingress of air into the anode chamber must be excluded, in order for fuel cells comprising Ni/YSZ anodes to be used.

In the past, a series of proposals have been made regarding the development of reoxidation-stable anodes, but these are usually unsatisfactory for anode substrates. In addition to the physical properties mentioned above, which should be aspired to, the anode substrate must also meet a very narrowly defined mechanical boundary condition, in order to prevent cracking of the electrolyte. During a change in gas, from oxidizing to reducing conditions, or vice versa, an anode substrate should not change by more than 0.05% of the edge length thereof (corresponding to 50 µm for a cell measuring 100×100 $mm^2$). Ideally, no measurable change in the size should occur.

This is difficult to achieve because, during a change in gas, from oxidizing to reducing conditions, or vice versa, the valence states of many transition metal cations change, bringing about a change in the crystal lattice parameters.

For example, substituted cerium dioxides are not completely stable in a combustible gas atmosphere, which is to say at oxygen partial pressures of $10^{-15} > P(O_2) > 10^{-22}$. Some of the $Ce^{4+}$ ions in the crystal lattice are reduced to $Ce^{3+}$ ions, resulting in two property changes. First, the reduction reaction prompts the formation of free electrons, and thus higher electronic conductivity. Secondly, the reduction of the cerium ions is associated with a significant increase in volume. The ion radius of $Ce^{4+}$ ions is 9.7 pm, that of $Ce3^+$ ions is 11.43 pm [1], which is known from A. Tsoga, A. Gupta, A. Naoumidis, P. Nikolopoulos, *Acta Mater.* 48 (2000) 4709. A material such as $Ce_{0.8}Gd_{0.2}O_{1.9}$ expands by 0.17% in an atmosphere of Ar/4% $H_2$/3% $H_2O$ at 800° C. and is therefore not usually suitable as an anode substrate. This tendency to an increase in length or volume can also be observed with perovskites, such as $LaCrO_3$, $LaMnO_3$, or $LaFeO_3$, wherein, in this case, there is a reduction reaction from $(Cr, Mn, Fe)^{4+}$ to $(Cr, Mn, Fe)^{3+}$.

In the literature, pure ceramic anodes are frequently described as being reoxidation-stable. However, in some cases they still do not meet the criterion of negligibly small change in length, and are not suitable for use as anode substrates. Additionally, pure ceramic anodes are often not sufficiently catalytically active, so that they do not appear suited as anodes at operating temperatures from 600 to 800° C. and therefore should only be used for electrolyte-supported fuel cells at operating temperatures of >800° C.

Several of the proposed solutions known from literature are set forth below.

U.S. patent application 2003/0165726 A1 describes the modification of an Ni/YSZ anode with the aim of improved redox stability, in that the structure is modified by small and large pores, so that no damage occurs to the structure during oxidation of the nickel. In order to produce the ceramic reticular system made of YSZ, $Al_2O_3$, $TiO_2$, doped $CeO_2$, MgO or spinels, these substances, together with a metal oxide in the form of a fine powder, are mixed with a pore-forming material and a liquid to form a paste. This paste is applied as a layer and sintered. The result is a two-part system having macropores and micropores, the first system comprising the electrode material and the second system comprising metals. This proposal, however, is little suited for achieving an equivalent anode substrate, because large pores have the effect that thin anode and electrolyte layers, and particularly the functional anode layer, cannot be applied as thick layers.

U.S. patent application 2004/0001994 A1 includes a description of anodes based on cerium-modified strontium titanate anodes (optionally containing La, Sc, or Y for Sr and optionally containing Ni, Co, Cu, Cr, or Fe for Ti). In addition to the use of these anodes in electrolyte-supported cells, the inventors also consider using the anode in anode-supported cells (paragraph [0066]). This, however, is not desirable, as cerium-containing materials form poorly conductive mixed phases with YSZ as the electrolyte, as disclosed in A. Tsoga, A. Gupta, A. Naoumidis, P. Nikolopoulos, *Acta Mater.* 48 (2000) p. 4709, and considerably impair the performance of fuel cells. The presence of cerium is, however, required for the use of the disclosed anode compositions, in order to ensure catalytic activity.

The anodes could be better used with a cerium dioxide-based electrolyte in order to avoid the poorly conductive mixed phases. However, this is only possible at operating temperatures of <600° C., since the cerium dioxide layer is otherwise partially reduced and tends to crack. The disclosed low cell performance at temperatures of <800° C., however, allows little promise for use in this variation.

Paragraph [0094] of A. Tsoga, A. Gupta, A. Naoumidis, P. Nikolopoulos, *Acta Mater.* 48 (2000) p. 4709, addresses the dimensional stability of such cerium-modified strontium titanate anodes in more detail and establishes that a change of up to 0.1% was acceptable for an SOFC anode. This may be true for electrolyte-supported cells, but this threshold value is too high for anode-supported cells.

It is apparent from US 2003/0165726 A1 that coarser powders result in considerably inferior cell performance due to higher polarization resistance (see FIG. 22 in the same). The polarization resistance values indicated in Table 1 of the same are achieved for different compositions after sintering the anodes at 1000° C. Since higher sintering temperatures are also always associated with a coarsening of the powder particles, it can be concluded that significantly inferior performance is to be expected if the anodes are sintered at 1350-1500° C., as is common for anode substrates. The use of cerium-modified strontium titanate anodes in anode-supported cells is therefore arguably possible with lower cerium content, but in all probability will not produce good power densities for the cells that are comparable to the state of the art.

In the U.S. patent application 2005/0250000 A1 the claims of the preceding patent application are extended to cerium dioxides having Nb, V, Sb, and Ta contents, however the disadvantages mentioned above remain in terms of use as an anode substrate.

The U.S. patent application 2004/0081893 A1 describes a material system, which comprises a component that expands during a change in the gas, from oxidizing to reducing conditions, and a component that contracts. As a result, the overall size of the components remains unchanged (dimensional stability). The expanding component comprises perovskites made of $(La, Ca, Sr)(Cr, Fe)O_3$ and the contracting component comprises vanadium oxide, but is not specified in greater detail. This material combination demonstrates that dimensional stability can be achieved by the use of a multiple components. However, it is not suited for use as an anode or anode substrate because it is neither catalytically active, nor has any significant ion conductivity. Paragraphs [0109] et seq. also address the use of cerium dioxides, and the descriptions correspond to those of preceding patent applications, including the disadvantages there described.

A redox-stable Ni/YSZ anode is achieved in US 2004/0121222 A1 by impregnating a YSZ structure with Ni or NiO. In order to ensure electrical current conduction, the Ni content must be 10-30%. Such a Ni content on the surface of a ceramic structure results in high coverage of the ceramic surface. This not only brings about a decrease of the catalytically active centers (three-phase boundaries of Ni, YSZ and pores), but due to the close contact of the Ni particles, also results in an aggregation of Ni during operation of the cell, and thus a successive loss of electrical conductivity. Permeation with such Ni content appears to be disadvantageous with respect to the long-term stability of such anode substrates.

SUMMARY OF THE INVENTION

It is the object of the invention to provide an advantageous material for use in components having a solid electrolyte, the material exhibiting not only very few changes in the outer dimensions when the ambient atmosphere varies, but also achieving a good electrochemical effect comparable to the state of the art when used in a fuel cell. In addition, this material combination must not have any chemical interaction with conventional electrolyte materials. In particular an anode substrate is to be provided, wherein an anode comprising the same is not harmed during unintentional or operational change in the gas, from oxidizing to reducing conditions, or vice versa.

A further object of the invention is to provide a method for producing such a material or anode.

The objects are achieved by an anode substrate according to the main claim, as well as by use thereof, and by a method for producing this substrate according to the additional independent claims. Advantageous embodiments of the anode substrate and of the use and production method can be found in the claims that refer to these claims.

The ceramic anode according to the invention comprises a composite having an electronically conductive and an ionically conductive phase. The composite is present as a mechanical, reticular porous ceramic base structure, which ensures both electronic and ionic transport. The anode further comprises a small fraction of a metal catalyst, which is disposed finely divided in the pores on the surface of the ceramic structure. The ceramic base structure comprises two ceramic oxides, one having predominantly electronic conductivity, the other having predominantly ionic conductivity under anodic conditions. The two ceramic oxides are present as separate phases which, in an ideal case, each form a separate, continuous reticular system. The porosity of the anode ranges between 15 and 500% by volume.

These two ceramics advantageously exhibit inverse tendencies in terms of the expansion behaviors thereof, during a change of the gaseous atmosphere, such that the individual changes in the length of the composite substantially compensate each other. Additional catalyst particles can be present in a finely divided manner on the ceramic surface on the inside of the pores and, due to the low load, normally have no influence on conductivity.

The electronically conductive phase of the anode according to the invention is lanthanide-substituted strontium titanate of the general formula $Sr_{1-x}Ln_xTiO_3$, wherein Ln=Y, Gd—Lu and $0.03<x<0.2$. This phase exhibits particularly good electrical conductivity in combination with only a slight change in length during changes in the atmosphere. A particularly suitable compound has been found to be $Sr_{1-x}Y_x\text{-}TiO_3$ wherein $0.07<x<0.1$ (SYT).

The electrical conductivity of SYT following a reduction at high temperatures, for example above >1300° C., is 20-100 S/cm at 800° C. in an anodic atmosphere. As differs from other oxides having Cr, Mn, and other transition metal cations, SYT does not expand during the reduction, but during the oxidation of the material.

The predominantly ionically conductive phase used is a ceramic in the form of $Y_2O_3$ or $Sc_2O_3$-stabilized zirconium dioxide (YSZ or ScSZ).

A mixture of SYT and YSZ (65:35% by volume) has a redox-stable conductivity of approximately 10 S/cm under anodic conditions. While this value is an order of magnitude smaller than that for a Ni/YSZ cermet, it does not make a significant contribution to the overall resistance of the fuel cell. The area-specific resistance for this material combination produces a value of approximately 15 $m\Omega^2$ for an anode substrate 1.5 mm thick. YSZ does not regularly undergo any change in length during the change from oxidizing to reducing conditions.

The resulting change in length of the composite can be even further reduced if CGO is used as the ion conductor, which exhibits an inverse behavior during a gas change, which is to say it expands during reduction. In principle, this may result in a composite that undergoes no change of length whatsoever during a change in the gas, from oxidizing to reducing conditions, or vice versa.

Particularly advantageous ratios between the electronically conductive phase and the ionically conductive phase in the anode have been found to be those between 50/50% by volume and 70/30% by volume. For the combination of SYT and YSZ, for example, a ratio of 65/35% by volume is particularly advantageous.

The anode according to the invention may advantageously comprise a catalyst for the reaction with the combustible gas. In particular, Ni, Co, Cu, Pd, Pt, Au, or Ru, or alloys of these metals, are suited as catalysts in the material according to the invention. They can be present in fractions of not more than 10% by volume, and particularly in fractions of not more than 5% by volume, with respect to the ceramic structure of the material.

Advantageously, the catalyst is disposed on the surface of the porous ceramic structure inside the pores. Due to the low fraction and small particle size, which usually ranges between 20 and 200 nm, and particularly between 50 and 150 nm, and is thus considerably smaller than the mean pore diameter of the ceramic structure, damage to the structure can be usually avoided during oxidation of the catalyst.

The invention will be described in more detail hereafter, based on figures and embodiments, without thereby limiting the invention to these examples.

DESCRIPTION OF THE PREFERRED EMBODIMENTS

According to the invention, the object of the invention is achieved by a composite comprising a first oxidic, electronically conductive material (phase) made of lanthanide-substituted strontium titanate ($Sr_{1-x}Ln_xTiO_3$ wherein Ln=Y, Gd—Lu and $0.03<x<0.2$). The preferred compound is $Sr_{1-x}Y_xTiO_3$ wherein $0.07<x<0.1$ (SYT) since, while other and higher substitutions can result in higher conductivity, they can also result in failure, in the form of cracking during a change in the gas, from oxidizing to reducing conditions, or vice versa. The electrical conductivity of SYT following reduction at high temperatures (>1300° C.) is 20-100 S/cm at 800° C. in an anodic atmosphere. While after high-temperature reduction SYT has an initial conductivity of 80 S/cm, it is reduced to approximately 20-30 S/cm after one-time oxidation, thereafter remaining constant even after further gas changes.

Figure 2:
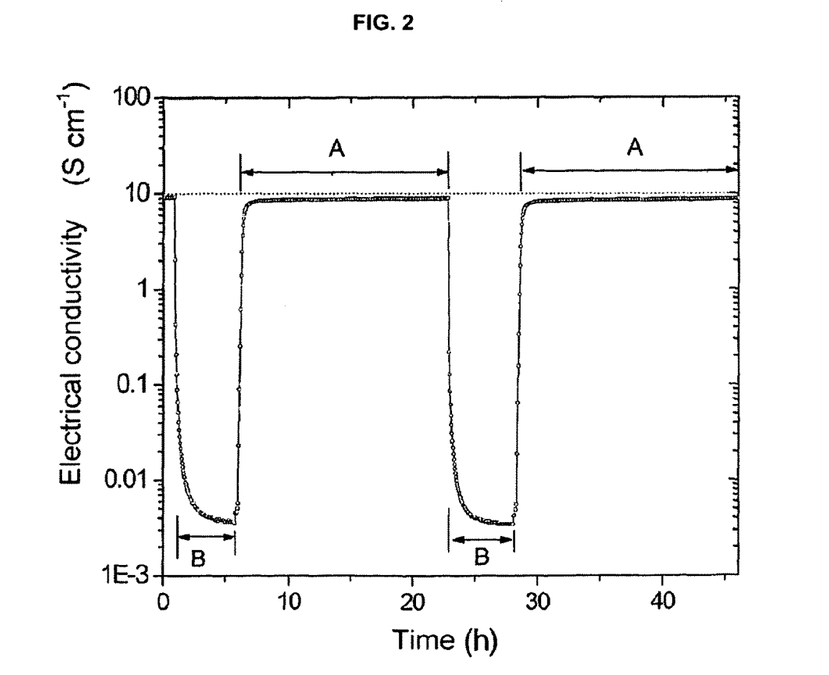
FIG. 2 shows a change in the electrical conductivity of an SYT/YSZ (65:35% by volume) material at 800° C. during a gas change between moist Ar/4% $H_2$ (A) and air (B)

The second ceramic component (phase) having predominant ionic conductivity used in the composite is $Y_2O_3$ or $Sc_2O_3$-stabilized zirconium dioxide (YSZ or ScSZ). A mixture of SYT and YSZ (65:35% by volume) has a redox-stable conductivity of approximately 10 S/cm under anodic conditions (FIG. 2). While this value is an order of magnitude smaller than for a Ni/YSZ cermet, it should not make a significant contribution to the overall resistance of the fuel cell. The area-specific resistance for this material combination produces a value of approximately 15 $m\Omega^2$ for an anode substrate 1.5 mm thick.

If, given a sufficient mechanical strength, the thickness of the substrate can be lowered to 0.5 or even 0.2 mm, the area-specific resistance would amount to only 5 or 2 $m\Omega^2$.

Figure 3:
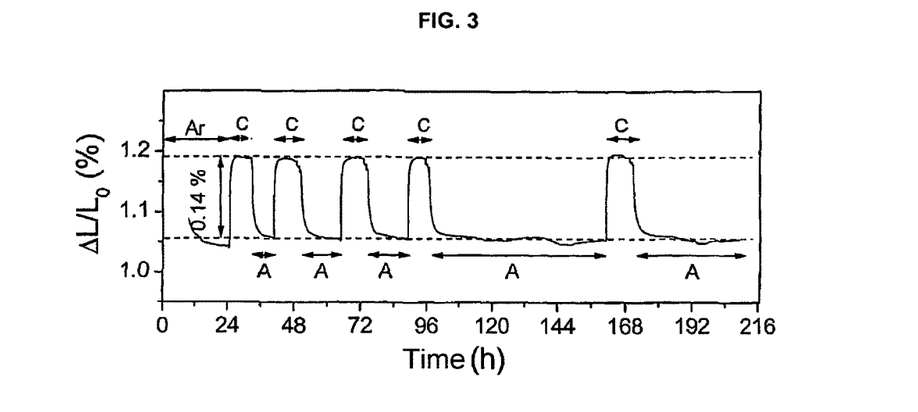
FIG. 3 shows a chemical expansion behavior of SYT (with 7 atom % Y) at 830° C. during a gas change between moist Ar/4% $H_2$ (A) and Ar/20% $O_2$ (C), Ar=argon
Figure 4:
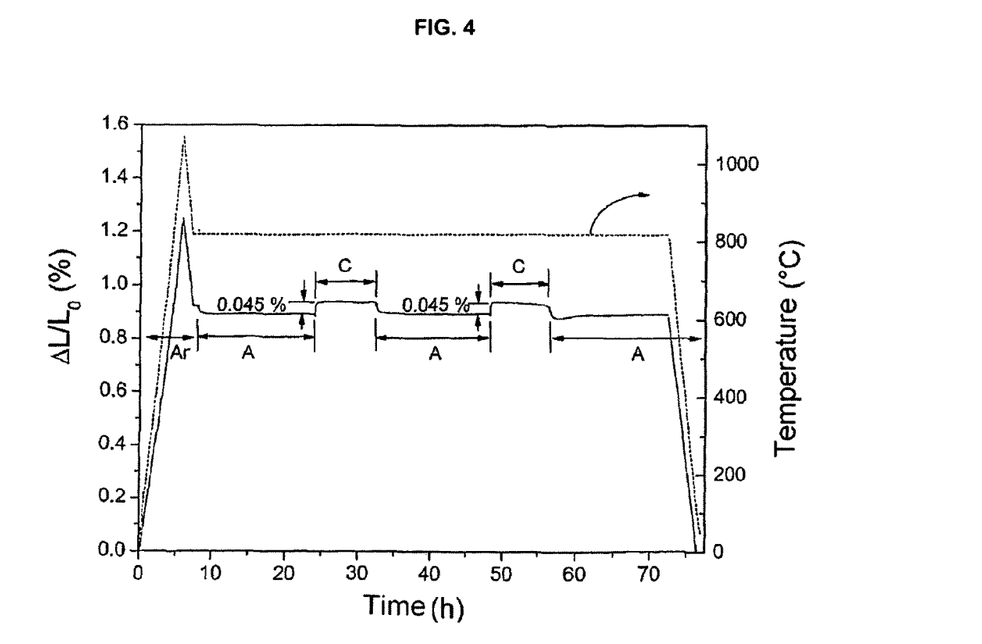
FIG. 4 shows a thermochemical expansion behavior of an SYT/YSZ composite (65:35% by volume); the sample was first heated to 1060° C., then cooled to 820° C. (in Ar), then subjected to multiple redox cycles (between moist Ar/4% $H_2$ (A) and Ar/20% $O_2$ (C) at 820° C.) and subsequently cooled to room temperature.

It has been found that the reactivity between SYT and YSZ is negligibly low. During sintering of this material mixture at 1400° C. for 5 hours, no reaction products were detected by X-ray diffraction. The thermal coefficient of expansion of SYT is $11-12\times10^{-6} K^{-1}$, which comes very close to the value of YSZ ($10.6-10.9\times10^{-6} K^{-1}$). In contrast to cerium dioxide or other oxides having Cr, Mn, and other transition metal cations, SYT does not expand during reduction, but rather during oxidation of the material, at 830° C. for Ar/4% $H_2$/3% $H_2O$ ($P(O_2)=10^{-18}$ bar) after exposure to air (or Ar/20% $O_2$) is 0.14% (FIG. 3). As described above, this would amount to a change in length of 140 μm for a cell measuring 100×100 mm$^2$, which requires further lowering. By admixing YSZ, which does not undergo any change in length, this value can be lowered to 0.045% (SYT/YSZ=65:35% by volume, FIG. 4).

Figure 5:
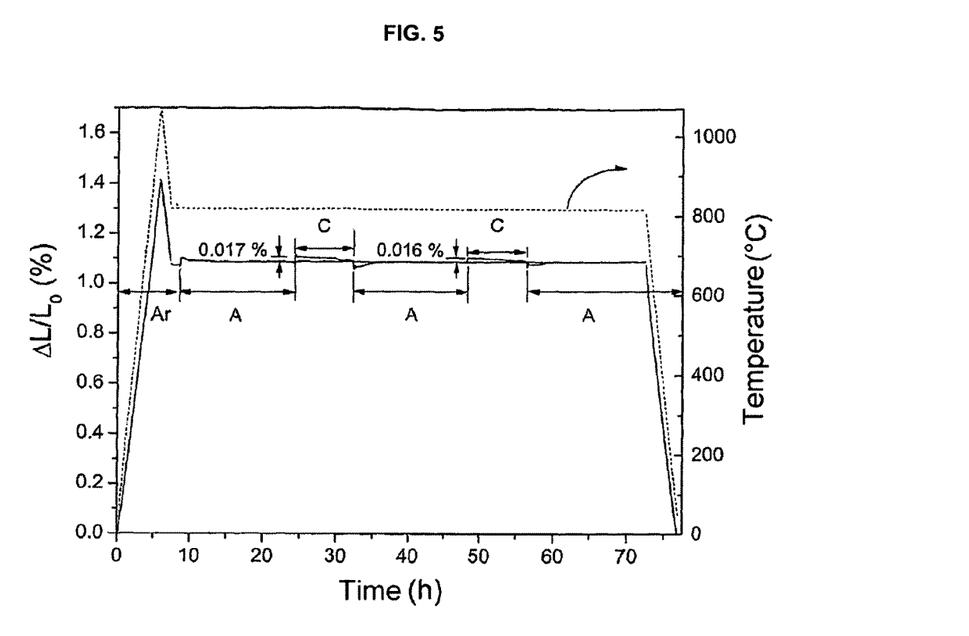
FIG. 5 shows a thermochemical expansion behavior of an SYT/CGO composite (65:35% by volume); the sample was first heated to 1060° C., then cooled to 820° C. (in Ar), subsequently subjected to multiple redox cycles (between moist Ar/4% $H_2$ (A) and Ar/20% $O_2$ (C) at 820° C.), and finally cooled to room temperature.

A further decrease in the resulting change in length of the anode can be achieved if an ion conductor such as CGO is used, which exhibits inverse behavior to that of the electron conductor during the gas change. In principle, this would result in a composite having no change of length whatsoever during the gas change. As is shown in FIG. 5, a composite made of SYT and CGO (65:35% volume) does, in fact, have almost no change in length. Only at the time of the gas change, a change of 0.016-0.017% occurs.

Despite this very advantageous behavior, other disadvantages can be expected during sintering with the electrolyte since a reaction with YSZ may occur, which impairs the conductivity of the electrolyte. The SYT/CGO composite is therefore advantageously only used for fuel cells comprising CGO electrolytes and having operating temperatures of <600° C.

The ceramic structure made of SYT/YSZ, or SYT/CGO, described here, can be used directly as a material for an anode substrate. The electrocatalytic activity for oxidation of the combustible gas, however, is generally insufficient at temperatures of 600-800° C. Catalysis is considerably improved by permeating the SYT/YSZ structure with small amounts of Ni as a catalyst.

Figure 6:
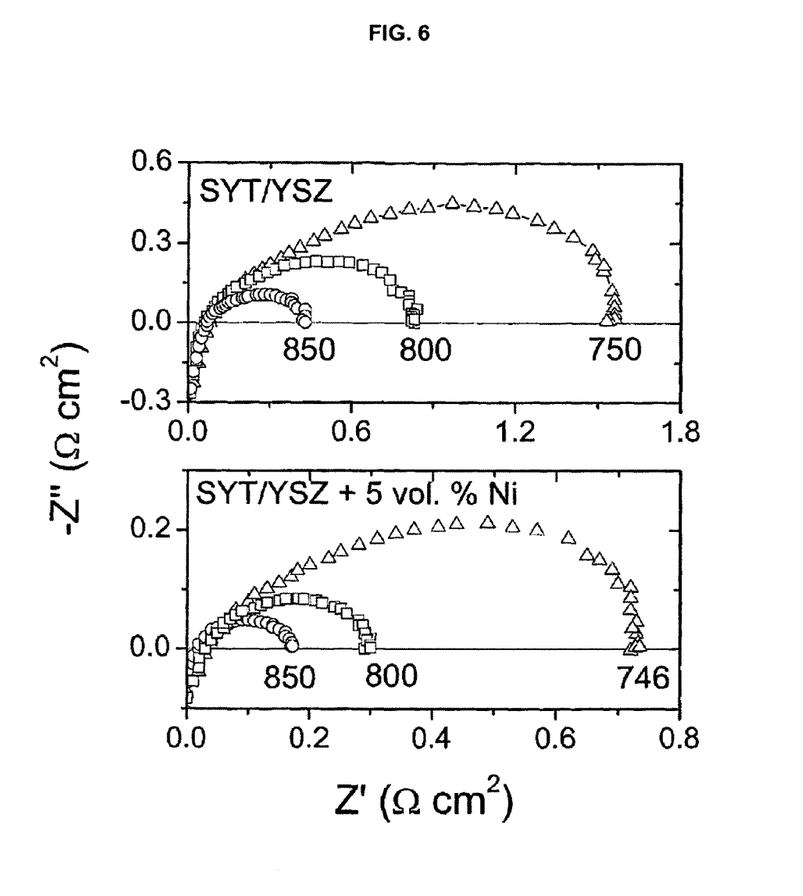
FIG. 6 shows an impedance spectra of SYT/YSZ anodes with and without 5% by volume Ni, measured at different temperatures (850, 800 and 750° C.) using moist Ar/5% $H_2$ as combustible gas. The ohmic resistance was deducted in order to compare the polarization resistance exclusively.
Figure 7:
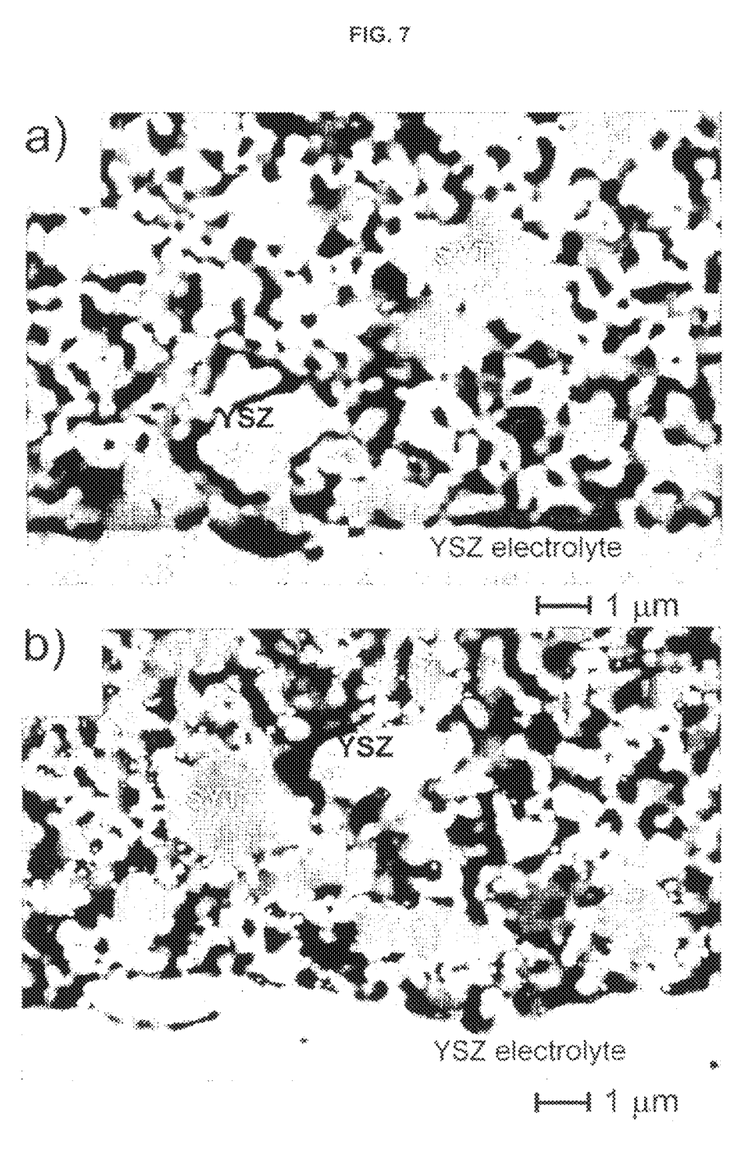
FIG. 7 shows a scanning electron microscopic images of SYT/YSZ anodes a) before and b) after permeation with 5% by volume Ni (in reduced state). The YSZ phase appears in light gray, the SYT phase in medium gray, and the pores in black. In addition, small round Ni particles (white) are apparent in b) on the walls of the pores.

As is shown in FIG. 6, the polarization resistance of an Ni-free SYT/YSZ anode is 0.49 m$\Omega^2$ in moistened Ar/5% $H_2$ at 850° C. After the permeating with 5% by volume of Ni, the electrode polarization resistance is reduced to 0.17 m$\Omega^2$ under identical test conditions, which is comparable to a Ni/YSZ anode. In this embodiment, the Ni particles were thoroughly distributed in the structure as grains measuring 50-150 nm and are considerably smaller than the mean pore diameter of 0.5-1 μm (FIG. 7). This not only results a large number of catalytically active centers, but the large pore volume surrounding them also prevents damage to the structure during oxidation. As an alternative, catalysts made of Co, Cu, Pd, Pt, Au, or Ru, or alloys of these metals can be introduced into the ceramic structure.

Using an SYT/YSZ anode substrate, which is permeated with just a few percent of Ni, after all of the production steps for an SOFC have been completed, and with the Ni particles being only about 1/10 the size of the pore diameter, it was possible to produce a redox-stable SOFC.

Compared to the properties of an anode according to the state of the art, the novel redox-stable anode according to the invention, made for example of SYT/YSZ/Ni, has the following properties:

Electrical conductivity (at 800° C.): 10-20 S/cm
Ionic conductivity (at 800° C.): approximately 0.001-0.005 S/cm
Thermal coefficient of expansion: $11-12\times10^{-6}$ K$^{-1}$
Ni percentage: 2-10% by volume (instead of the previous 35-45% by volume) relative to the total solid matter.

Figure 1:
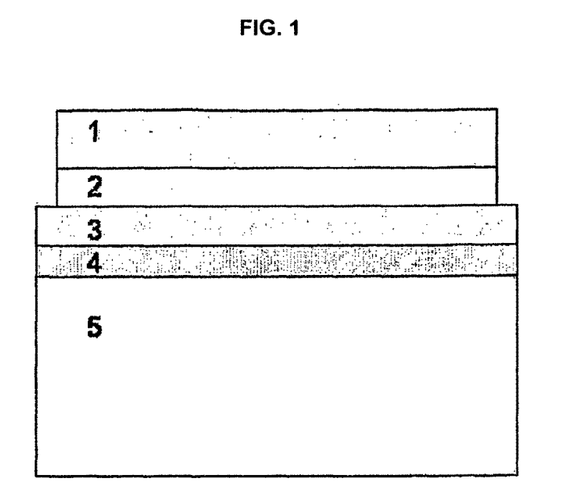
FIG. 1 shows a layer structure of a typical planar SOFC having an Ni/YSZ anode substrate comprising:
1: Cathode current collector layer (KSSS), LSM, ~50-100 mm
2: Functional cathode layer (KFS) LSM/YSZ, ~10-30 mm
3: Electrolyte layer, YSZ, 5-10 mm
4: Functional anode layer (AFS) Ni/YSZ, ~5-15 mm
5: Anode current collector layer (ASSS) /Anode substrate/Ni/YSZ, 300-1500 mm
Figure 8:
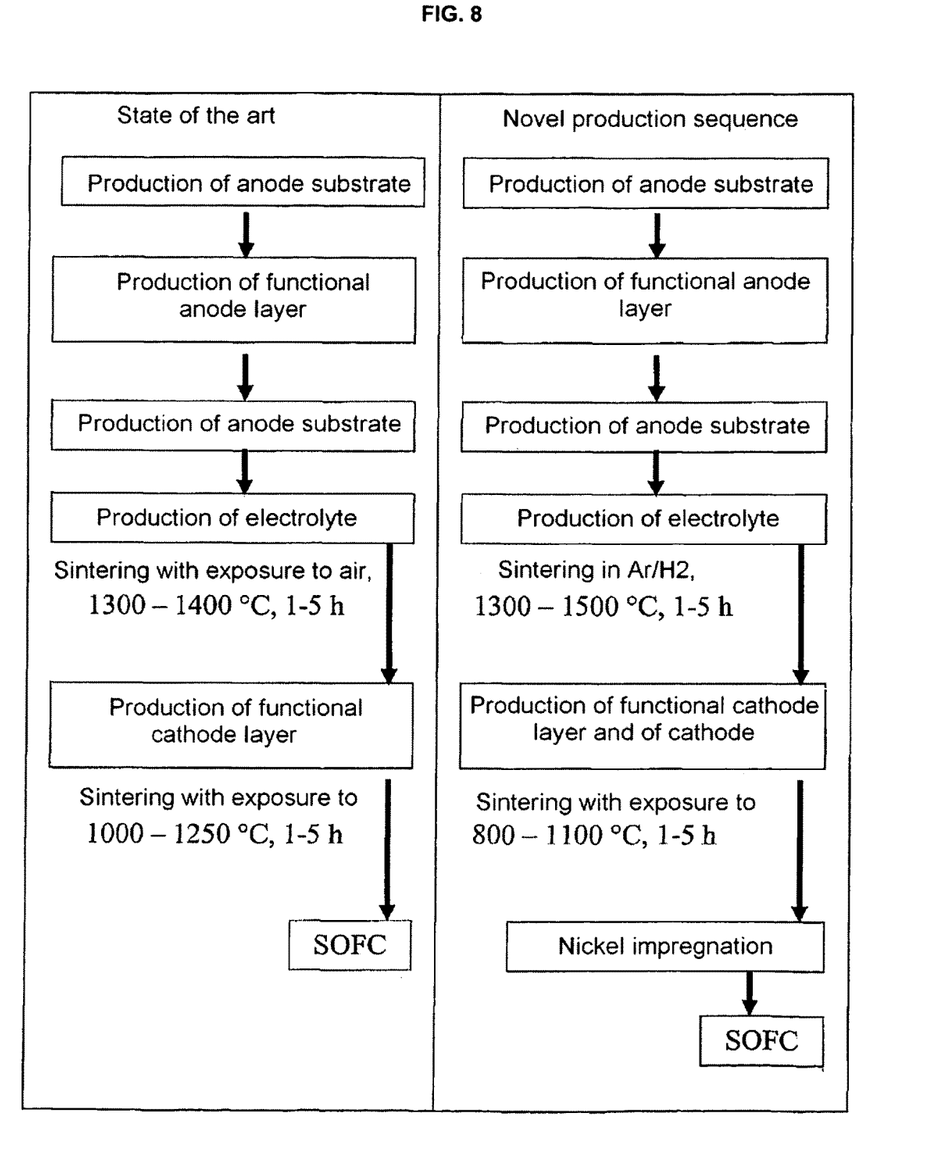
FIG. 8 shows a flow for a method for producing an anode-supported SOFC according to the state of the art and for implementing a redox-stable anode substrate comprising SYT/YSZ/Ni.

In order to produce a fuel cell according to FIG. 1, however, the steps of the method must be modified as compared to the prior art, in order to obtain an electrically conductive component in the anode. FIG. 8 illustrates the essential changes in a flow chart.

In the method for producing the material mixture according to the invention, first the starting materials for the electronically conductive and ionically conductive phases, in the form of powders having a mean particle size between 1 and 5 μm, are blended and typically are mixed with an organic binder system in order to produce a substrate (anode current collector layer, FIG. 1), for example by film casting, or hot or cold pressing.

The simplest method of production is the direct coating of the substrate with an electrolyte layer and subsequent sintering. The function of the substrate as an anode is implemented finally by permeation with metal salts. It has been shown in the past that an additional functional anode layer (AFS) having more fine-grained particles than in the anode substrate produces better power densities for the fuel cell. The preferred mean particle size in the functional anode layer is typically 1/10 relative to that present in the anode substrate. For the functional anode layer, it ranges particularly between 0.1 and 0.7 μm. Therefore, for the fuel cell according to the invention, an AFS is provided in which the YSZ and SYT particles have different particle sizes than those in the substrate. The use of a functional anode layer depends on the layer thickness of the substrate. In the case of thin substrates (<0.5 mm), a functional anode layer is not required and the anode of the fuel cell can be configured according to claims 1-5. In the case of thick substrates (approximately 0.5-2 mm), larger pores and particles (1-5 μm, respectively) are advantageous in order to ensure better gas exchange. In order to achieve similarly good power density and improve electrocatalysis, however, an AFS having a thickness of 5-50 μm must still be applied to the substrate.

In order to design a cell as economically as possible, an electrolyte layer, or a functional anode layer, is applied directly to the anode substrate, for example by screen printing, and this composite is then sintered at temperatures of 1300-1500° C. According to the state of the art, sintering is typically performed with exposure to air; and thus according to the claimed arrangement, first heating to approximately 900 or 1000° C. is performed with exposure to air, in order to burn off the auxiliary organic materials, then the atmosphere is changed to Ar/$H_2$ and sintering is continued for 1-5 hours at 1300-1500° C., in order to produce the electronically conductive phase in the anode substrate.

In the event that the sintering behavior of the layered composite is not sufficiently good, burning off of the organic auxiliary materials and pre-sintering of the anode substrate can be performed before applying the functional anode and electrolyte layers. While this requires an additional sintering step, it has the advantage of optionally allowing the reducing sintering operation in Ar/$H_2$ to be performed during a full temperature cycle, if a change of the atmosphere during the temperature program is not possible due to the system design.

After the composite comprising the anode current collector layer (ASSS), functional anode layer (AFS) and electrolyte layer has been produced, the functional cathode layer (KFS) and cathode current collector layer (KSSS) can be applied, which are sintered together with exposure to air at 800-1000° C. This reduces the electrical conductivity of the anode current collector layer, but it is restored during operation of the fuel cell.

After the cathode has been sintered, the porous anode substrate is lastly permeated with the catalyst (Ni, Co, Cu, or precious metal) according to claims 6-11 in the form of a diluted, water-soluble saline solution. The salt should decompose during the initial heating of the cell, or cell stack, and burn off-without leaving any residue. Salts that may be used are nitrates, carbonates, citrates, or other salts of organic acids, and in the case of some precious metals it is also possible to use chlorides or complex salts. The concentration of the saline solution should be selected high enough that a load of at least 1-2% by weight is achieved with each permeation process, so that possibly no more than 3-5 permeation and drying steps are required. Typically, this can be achieved with a saturated nitrate salt solution.

Compared to the prior art, this production sequence is additionally advantageous in that no harmful, powdery nickel oxide is employed, during the entire production process, and in that the quantities of metal salts with which this is to be permeated are considerably lower than the quantity of nickel oxide normally used.

The invention claimed is:

1. An anode for a high-temperature fuel cell having at least one of an anode substrate and a functional anode layer comprising a porous ceramic structure having a first predominantly electron-conducting phase with the general empirical formula $Sr_{1-x}Ln_xTiO_3$ wherein Ln=Y, Gd to Lu and $0.07<x<0.1$, the first predominantly electron-conducting phase having an electrical conductivity of 10 to 100 S/cm at 800° C. following reduction at temperatures greater than 1300° C., and having a second predominantly ion-conducting phase component comprising yttrium or scandium-stabilized zirconium dioxide (YSZ or ScSZ) or a lanthanide-substituted cerium oxide, the volume ratio of the first predominantly electron-conducting phase to the second predominantly ion-conducting phase is in the range of 80:20 to 50:50, and a catalyst disposed on the surface of the pores of the porous ceramic structure.

2. The anode according to claim 1, wherein the volume ratio of the first predominantly electron-conducting phase to the second predominantly ion-conducting phase is in the range of 70:30 to 60:40.

3. The anode according to claim 1, having a porosity of 15 to 50% by volume.

4. The anode according to claim 1, wherein the mean pore diameter ranges between 0.2 and 5 μm.

5. The anode support according to claim 1, comprising $Sr_{1-x}Y_xTiO_3$ as the first predominantly electron-conducting phase.

6. The anode according to claim 1, comprising yttrium or scandium-stabilized zirconium dioxide as the second predominantly ion-conducting phase.

7. The anode according to claim 1, wherein the catalyst is present in the amount of no more than 15% of the total volume.

8. The anode according to claim 7, wherein the catalyst is present in the form of particles and the ratio of the mean diameter of the catalyst particles to the mean pore diameter of the porous ceramic structure is $\leq 1:10$.

9. The anode according to claim 7, wherein the catalyst is present in the form of catalyst particles having a mean diameter of 20 to 500 nm.

10. The anode according to claim 7, comprising Ni, Co, Au, Pd, Pt, or Ru as the catalyst.

11. The anode according to claim 7, comprising Cu as the catalyst.

12. The anode according to claim 1, wherein the mean pore diameter ranges between 0.5 and 1 μM.

13. An anode for a high temperature fuel cell having an anode substrate and a functional anode layer, the anode substrate and the functional anode layer each comprising a porous ceramic structure having a first predominantly electron-conducting phase with the general empirical formula $Sr_{1-x}Ln_xTiO_3$ wherein Ln=Y, Gd to Lu and $0.07<x<0.1$, and having a second predominantly ion-conducting phase component made of yttrium or scandium-stabilized zirconium dioxide (YSZ or ScSZ), the volume ratio of the first predominantly electron-conducting phase to the second predominantly ion-conducting phase is in the range of 80:20 to 50:50, a mean particle size of the phases in the functional anode layer being smaller than that of the anode substrate, and the functional anode layer including a catalyst in the amount of not more than 15% of the total volume of the functional anode layer.

14. An anode for a high-temperature fuel cell having at least one of an anode substrate and a functional anode layer comprising a porous ceramic structure having a first predominantly electron-conducting phase with the general empirical formula $Sr_{1-x}Ln_xTiO_3$ wherein Ln=Y, Gd to Lu and $0.07<x<0.1$, the first predominantly electron-conducting phase having an electrical conductivity of 10 to 100 S/cm at 800° C. following reduction at temperatures greater than 1300° C., and having a second predominantly ion-conducting phase component comprising a lanthanide-substituted cerium oxide, the volume ratio of the first predominantly electron-conducting phase to the second predominantly ion-conducting phase is in the range of 80:20 to 50:50, and a catalyst disposed on the pores of the porous ceramic structure.

15. The anode according to claim 14, wherein the volume ratio of the first predominantly electron-conducting phase to the second predominantly ion-conducting phase is in the range of 70:30 to 60:40.

16. An anode for a high-temperature fuel cell having at least one of an anode substrate and a functional anode layer comprising a porous ceramic structure having a first predominantly electron-conducting phase comprising $Sr_{1-x}Y_xTiO_3$ wherein $0.07<x<0.1$ and having a second predominantly ion-conducting phase component comprising yttrium-stabilized zirconium dioxide (YSZ), the volume ratio of the first predominantly electron-conducting phase to the second predominantly ion-conducting phase is in the range of 80:20 to 50:50, and a catalyst comprised of nickel particles disposed on the surface of the pores of porous ceramic structure, the catalyst being present in an amount of 2-10 vol%, wherein the electrical conductivity of the anode at 800° C. is 10-20 S/cm, ionic conductivity is 0.001-0.005 S/cm, and the thermal coefficient of expansion is $11 \times 10^{-6} K^{-1}$ to $12 \times 10^{-6} K^{-1}$.

17. The anode according to claim 16, wherein the volume ratio of the first predominantly electron-conducting phase to the second predominantly ion-conducting phase is in the range of 70:30 to 60:40.

* * * * *